(12) United States Patent
Masada

(10) Patent No.: US 7,971,424 B2
(45) Date of Patent: Jul. 5, 2011

(54) HEAT CYCLE SYSTEM AND COMPOSITE HEAT CYCLE ELECTRIC POWER GENERATION SYSTEM

(76) Inventor: Noboru Masada, Narashino (JP)

( * ) Notice: Subject to any disclaimer, the term of this patent is extended or adjusted under 35 U.S.C. 154(b) by 539 days.

(21) Appl. No.: 12/085,351

(22) PCT Filed: Oct. 12, 2006

(86) PCT No.: PCT/JP2006/320369
§ 371 (c)(1),
(2), (4) Date: May 22, 2008

(87) PCT Pub. No.: WO2007/063645
PCT Pub. Date: Jun. 7, 2007

(65) Prior Publication Data
US 2009/0165456 A1 Jul. 2, 2009

(30) Foreign Application Priority Data
Nov. 29, 2005 (JP) ................................ 2005-343235

(51) Int. Cl.
*F02C 6/00* (2006.01)
*F01K 25/02* (2006.01)
(52) U.S. Cl. ............ 60/39.182; 60/650; 60/655; 60/682
(58) Field of Classification Search ............... 60/39.182, 60/650, 655, 682–683
See application file for complete search history.

(56) References Cited

U.S. PATENT DOCUMENTS

| | | | | |
|---|---|---|---|---|
| 3,992,891 A | * | 11/1976 | Pocrnja | 62/50.3 |
| 3,995,431 A | * | 12/1976 | Schwartzman | 60/684 |
| 5,537,822 A | * | 7/1996 | Shnaid et al. | 60/659 |
| 2002/0053196 A1 | * | 5/2002 | Lerner et al. | 60/39.182 |
| 2005/0272921 A1 | | 12/2005 | Furuya et al. | |
| 2008/0028766 A1 | | 2/2008 | Masada | |

FOREIGN PATENT DOCUMENTS

GB 2 174 148 10/1986
(Continued)

OTHER PUBLICATIONS

Patent Cooperation Treaty (PCT) International Preliminary Report on Patentability, issued Aug. 31, 2004.

(Continued)

*Primary Examiner* — Hoang M Nguyen
(74) *Attorney, Agent, or Firm* — Wenderoth, Lind & Ponack, L.L.P.

(57) ABSTRACT

A high-efficiency heat cycle system including a compressor, a first turbine, first and second heat exchangers 7 and 8, a first pump, and an expander, and a composite heat cycle power generator using the high-efficiency heat cycle system. Working gas Fg compressed in the compressor (C) drives a first turbine (S) and is thereafter cooled by passing through a heat dissipating side of a first heat exchanger (7) and then raised in pressure by a first pump (P) to form high-pressure working liquid Fe, the high-pressure working liquid is expanded and evaporated in an expander (K) to form working gas Fg, said working gas Fg is heated by passing through a heat receiving side 82 of the second heat exchanger before being introduced into the compressor C. A heat dissipating side 81 of the second heat exchanger comprises a heat dissipating portion of a refrigerating machine or a heat dissipating portion for waste heat from a heating machine.

17 Claims, 7 Drawing Sheets

FOREIGN PATENT DOCUMENTS

| | | |
|---|---|---|
| JP | 110402 | 5/1935 |
| JP | 43-4068 | 2/1968 |
| JP | 51-52352 | 4/1976 |
| JP | 54-27640 | 3/1979 |
| JP | 56-31234 | 3/1981 |
| JP | 61-79955 | 4/1986 |
| JP | 61-229905 | 10/1986 |
| JP | 2-040007 | 2/1990 |
| JP | 2003-227409 | 8/2003 |
| JP | 2003-322425 | 11/2003 |
| WO | 2005/119016 | 12/2005 |

OTHER PUBLICATIONS

International Search Report issued Nov. 21, 2006 in the International (PCT) Application of which the present application is the U.S. National Stage.

* cited by examiner

HEAT CYCLE SYSTEM AND COMPOSITE HEAT CYCLE ELECTRIC POWER GENERATION SYSTEM

TECHNICAL FIELD

The present invention relates to a heat cycle system including a compressor, an expander, a power generator, first and second heat exchangers, and a composite heat cycle electric power generation system using the heat cycle system. More particularly, the present invention relates to a heat cycle system and a composite heat cycle electric power generation system having such a heat cycle system combined with a Rankine cycle system. In the heat cycle system, working gas compressed in a compressor is chilled and condensed as it passes a heat dissipating side of the first heat exchanger, after driving the first turbine, and is thereafter increased in pressure by a pump to form high-pressure working liquid, which is expanded and evaporated in an expander to form working gas, which is heated (heat crossing) as it passes heat receiving sides of the first and second heat exchangers, and is thereafter introduced to the compressor.

BACKGROUND ART

There have heretofore been many inventions of heat cycle systems that are capable of converting heat into work or electric power with a high efficiency, using working liquid. For example, JP-A-54-27640 (Japanese Patent Public Disclosure) discloses an electric power generation system that recovers thermal energy of high-temperature exhaust gas. The electric power generation system has a waste heat boiler installed at the upstream side of high-temperature exhaust gas flow path and a fluid preheater at the downstream side thereof. JP-A-61-229905 or GB 2 174 148 A discloses a process of mechanical power generation using a binary cycle comprising a first cycle using two immiscible fluids and a second cycle using a refrigerant fluid. JP-A-2-40007 discloses a power system wherein a reverse Rankine cycle and a Rankine cycle are combined.

First, the thermal efficiency of the heat cycle system will be described below. Assuming that while a working substance is performing one cycle, i.e. undergoing successive changes and then returning to the previous state, it receives a quantity of heat $Q_h$ from a high heat source at a temperature $T_h$ and loses a quantity of heat $Q_b$ from a low heat source at a temperature $T_b$ to do work L (assumed to be a value expressed in terms of heat quantity) to the outside, the following relationship holds:

$$Q_h = Q_b + L \qquad \text{(Eq. 1)}$$

In heat engines, the work L is given to the outside. In refrigerators or heat pumps, the work L is given to working fluid from the outside. In the case of heat engines, it is desirable that the quantity of heat $Q_h$ received from the high heat source should be minimum, and the work L given to the outside should be maximum. Accordingly, the following equation is referred to as thermal efficiency:

$$\eta = L/Q_h \qquad \text{(Eq. 2)}$$

From the above equation, L may be rewritten as follows:

$$\eta = (Q_h - Q_b)/Q_h \qquad \text{(Eq. 3)}$$

The thermal efficiency η of a heat engine that performs a reversible Carnot cycle may be expressed by using thermodynamic temperatures $T_h°$ K. and $T_b°$ K. as follows:

$$\eta = (T_h - T_b)/T_h = 1 - (T_b/T_h) \qquad \text{(Eq. 4)}$$

In general, an apparatus that transfers heat from a low-temperature object to a high-temperature object is called a "refrigerator". The refrigerator is an apparatus that is generally used for the purpose of cooling objects. Meanwhile, an apparatus that transfers heat from a low-temperature object to a high-temperature object to heat the latter is referred to as a "heat pump". The name "heat pump" may be regarded as an alias for the refrigerator when the usage is changed. The heat pump is used, for example, for a heating operation of an air conditioner for heating and cooling. The relationship between the quantity of heat $Q_b$ absorbed from a low-temperature object, the quantity of heat $Q_h$ given to a high-temperature object, and the work L (value expressed in terms of heat quantity) done from the outside to operate the heat pump is expressed as follows:

$$Q_h = Q_b + L \qquad \text{(Eq. 5)}$$

It can be said that, for the same work done, the larger the quantity of heat $Q_h$ given, the higher the cost efficiency of the heat pump. Accordingly, the following equation is referred to as the coefficient of performance of the heat pump:

$$\epsilon = Q_h/L \qquad \text{(Eq. 6)}$$

From the above Eq. 5, L is:

$$L = Q_h - Q_b \qquad \text{(Eq. 7)}$$

Hence, the performance coefficient E is expressed as follows:

$$\epsilon = Q_h/(Q_h - Q_b) \qquad \text{(Eq. 8)}$$

Assuming that the absolute temperature of the low heat source is $T_b°$ K. and the absolute temperature of the high heat source is $T_h°$ K., a heat pump that performs a reversible Carnot cycle exhibits the largest coefficient of performance among heat pumps operating between the two heat sources. The performance coefficient E of the heat pump is:

$$\epsilon = T_b/(T_h - T_b) \qquad \text{(Eq. 9)}$$

The reversible Carnot cycle consists of two isothermal changes and two adiabatic changes and exhibits the maximum thermal efficiency among all cycles operating between the same high and low heat sources.

FIG. 1 is an arrangement plan showing constituent elements of a heat cycle system including a conventional refrigerator J. Refrigerant gas Fg raised in pressure by a compressor C gives heat $Q_h$ to a fluid Z in a heat exchanger (condenser) 7, thereby being condensed. Thereafter, the refrigerant is expanded through an expansion valve V. Consequently, the refrigerant lowers in temperature and, at the same time, absorbs heat $Q_b$ from a fluid $Z_2$ in a heat exchanger 8 to cool the fluid $Z_2$. Thereafter, the refrigerant is returned to the compressor C and then recirculated. Let us discuss the thermal calculation of a refrigerator arranged as shown in FIG. 1 and adapted to use ammonia as a refrigerant. For the sake of simplicity, let us assume that there is no mechanical loss. The temperature of the refrigerant is 110° C. ($T_3$) at the outlet of the compressor C, 38° C. ($T_2$) at the outlet of the condenser 7, and −10° C. (T) at the outlet of the evaporator V. Therefore, the performance coefficient (theoretically maximum performance coefficient) ε of the refrigerator on the reversible Carnot cycle is:

$$\varepsilon = T/(T_2 - T) \qquad \text{(Eq. 10)}$$

$$= [273.15 + (-10)]/[38 - (-10)] \approx 5.4$$

In the refrigerator shown in FIG. 1, if the input L (work) of the compressor C is assumed to be 1, the performance coefficient $\epsilon_h$ of the heat pump (the performance coefficient of the refrigerator +1) is:

$$\epsilon_h=5.4+1=6.4 \quad (\text{Eq. 11})$$

FIG. 2 is an arrangement plan showing basic constituent elements of a heat cycle system including a steam turbine (heat engine A). High-temperature and high-pressure steam Fg generated in a boiler B is supplied to a turbine S to rotate it, thereby generating power (work) W. The steam is cooled to form condensate Ee in a condenser Y communicating with the exhaust opening of the turbine. The condensate Ee is raised in pressure by a pump P and then supplied to the boiler B. In the heat cycle system shown in FIG. 2, when waste heat $Q_2$ from the condenser Y is not utilized at all, work W (value expressed in terms of heat quantity) generated from the turbine S is given by:

$$W=Q-Q_2 \quad (\text{Eq. 12})$$

The thermal efficiency $\eta_S$ of the turbine S is:

$$\eta_S=(Q-Q_2)/Q \quad (\text{Eq. 13})$$

In Eq. 12 and Eq. 13, Q is the quantity of heat retained by the working fluid at the turbine inlet side, and $Q_2$ is the quantity of heat output from the working fluid at the turbine outlet side, which is equal to the quantity of waste heat discharged from the condenser Y.

The thermal efficiency $\eta_0$ of the heat cycle system shown in FIG. 2, i.e. the ratio $\eta_0$ of work W generated from the turbine S to the quantity of heat (retained heat quantity) Q input to the working fluid in the heat cycle system, is given by:

$$\eta_0=W/Q \quad (\text{Eq. 14})$$

If W in Eq. 14 is replaced by $W=Q-Q_2$ of Eq. 12, we have:

$$\eta_0=(Q-Q_2)/Q \quad (\text{Eq. 16})$$

This is the same as the above-mentioned $\eta_S$. Therefore, the following relationship holds:

$$\eta_0=\eta_S \quad (\text{Eq. 17})$$

In the heat cycle system of FIG. 2, if a part or whole $Q_3$ of the waste heat $Q_2$ from the condenser Y is transferred to the condensate at the boiler inlet by a feedwater preheater $Y_2$, i.e.

$$0 \leqq Q_3 \leqq Q_2 \quad (\text{Eq. 18})$$

and, at the same time, the quantity of heat input to the boiler is reduced by the same amount as the quantity of heat transferred from the condenser Y, then the boiler input heat quantity is $Q-Q_3$. The quantity of heat retained by steam Fg at the inlet of the turbine S is given by:

Boiler input heat quantity $(Q-Q_3)$+(heat quantity $Q_3$ transferred by $Y_2$)=Q  (Eq. 19)

The quantity of heat retained by steam Fg at the outlet of the turbine S can be regarded as being $Q_2$. Therefore, power W (value expressed in terms of heat quantity) generated from the turbine S is:

$$W=Q-Q_2 \quad (\text{Eq. 20})$$

Hence, the thermal efficiency $\eta_S$ of the turbine S is:

$$\eta_S=(Q-Q_2)/Q \quad (\text{Eq. 21})$$

Thus, the thermal efficiency $\eta_S$ of the turbine S is the same as in the case where the waste heat $Q_2$ from the condenser Y is not utilized.

In the heat cycle system of FIG. 2, if a part or whole $Q_3$ of the waste heat $Q_2$ from the condenser Y is transferred to the condensate at the boiler inlet by the feedwater preheater $Y_2$ and, at the same time, the boiler input heat quantity is reduced by the same amount as the heat quantity $Q_3$ transferred from the condenser Y, i.e. $(Q-Q_3)$, the thermal efficiency $\eta$ of the heat cycle system shown in FIG. 2, that is, the ratio of the work W generated from the turbine S, i.e. $W=Q-Q_2$ . . . (Eq. 22), to the input heat quantity of the heat cycle system, i.e. $(Q-Q_3)$, is expressed as follows:

$$\eta=W/(Q-Q_3)=(Q-Q_2)/(Q-Q_3) \quad (\text{Eq. 23})$$

In the heat cycle system of FIG. 2, if the waste heat $Q_2$ from the condenser Y is not utilized at all, i.e. $Q_3=0$, the above Eq. 23 becomes as follows:

$$\eta=(Q-Q_2)/Q \quad (\text{Eq. 24})$$

In the case of $0 \leqq Q_3 \leqq Q_2$ . . . (Eq. 18), we have:

$$\eta=(Q-Q_2)/(Q-Q_3) \quad (\text{Eq. 25})$$

In the case of Eq. 25, the denominator is smaller than that in Eq. 24 by $-Q_3$, and hence the value of $\eta$ becomes correspondingly larger than in Eq. 24.

If the whole $Q_2$ of waste heat from the condenser is transferred to the condensate at the upstream or downstream side of the pump P, we have:

$$Q_2=Q_3 \quad (\text{Eq. 26})$$

Hence, the thermal efficiency $\eta$ of the heat cycle system is:

$$\eta=1 \quad (\text{Eq. 27})$$

In the heat cycle system of FIG. 2, the thermal efficiency $\eta$ thereof in the case of $0 \leqq Q_3 \leqq Q_2$ . . . (Eq. 18) is, as stated above, given by:

$$\eta=(Q-Q_2)/(Q-Q_3) \quad (\text{Eq. 28})$$

If the denominator and numerator of Eq. 28 are each divided by Q, we have:

$$\eta=[(Q-Q_2)/Q]/[(Q-Q_3)/Q] \quad (\text{Eq. 29})$$

Eq. 29 may be modified as follows:

$$\eta=[(Q-Q_2)/Q]/[1-(Q_3/Q)] \quad (\text{Eq. 30})$$

If $\eta_S=(Q-Q_2)/Q$ . . . (Eq. 21) is inserted into Eq. 30, we have:

$$\eta=\eta_S/(1-Q_3/Q) \quad (\text{Eq. 32})$$

In the present invention, even heat having low utility value, such as waste heat, is taken into the heat cycle system by using a heat pump, and a power output is taken out by a turbine in the heat cycle system. The heat cycle system according to the present invention uses heat crossing to extract power from the turbine at high efficiency. When the whole of waste heat $Q_2$ from the condenser Y is utilized, the thermal efficiency $\eta$ of the heat cycle system is $\eta=1$ according to Eq. 27.

As will be understood from the above Eq. 32, the thermal efficiency $\eta$ of the heat cycle system is determined by the thermal efficiency $\eta_S$ of the turbine S and the heat quantity $Q_3$ transferred from the waste heat of the condenser Y to the condensate at the upstream or downstream side of the pump P. As $Q_3$ increases to approach Q, the denominator of Eq. 30, i.e. $(1-Q_3/Q)$, decreases. Consequently, $\eta$ increases. It is difficult to increase the heat crossing ratio $Q_3/Q$ in heat cycles other than the refrigerating cycle. The reason for this is that it is impossible to increase the temperature difference between a high heat source and a low heat source for heat transfer (heat crossing). Further, Eq. 27 cannot be realized in heat cycles other than the refrigerating cycle.

Patent reference 1: JP-A-54-27640 (Japanese Patent Public Disclosure)
Patent reference 2: JP-A-61-229905 (Japanese Patent Public Disclosure)

Patent reference 3: GB2,174,148A
Patent reference 4: JP-A-2-40007 (Japanese Patent Public Disclosure)

SUMMARY OF THE INVENTION

Problem to be Solved by the Invention

An object of the present invention is to provide a high-efficiency heat cycle system including a compressor, an expander, and first and second heat exchangers and a composite heat cycle electric power generation system using the system. Another object of the present invention is to provide a heat cycle system that is capable of using a dissipating side of the second heat exchanger of the heat cycle system as a low-temperature chamber such as a chamber to be air-conditioned, a refrigerator, or an ice-making chamber, or a dissipating portion for waste heat of various types. Another object of the present invention is to provide a high-efficiency heat cycle system adapted to transfer waste heat or heat in nature to working fluid and use the heat. Another object of the present invention is to improve the thermal efficiency of a composite heat cycle system formed by combining a steam turbine and a refrigerator. Another object of the present invention is to improve the thermal efficiency of the heat cycle electric power generation system by transferring (heat crossing) the waste heat of steam turbine outlet steam to working fluid at the steam turbine inlet side. Another object of the present invention is to provide a heat cycle system that is capable of forming a low heat source by combining a heat receiving side (heat absorbing side) of the heat cycle system with a heat dissipating side of a refrigerating machine, the low heat source having such an extremely low temperature as to liquefy a gas such as LNG or LPG.

A further object of the present invention is to convert low-temperature waste heat in a Rankine cycle, into a high-temperature thermal output. A still further object of the present invention is to provide a heat cycle system wherein a refrigeration output of a refrigerator is used as a low heat source of a condenser (cooler) installed at the turbine outlet in a Rankine cycle, and the refrigerator is operated as a heat pump, thereby allowing heat emitted from the condenser to be raised in temperature and supplied as a thermal output to the outside. In the present invention, the heat crossing ratio $Q_3/Q$ is increased by using a refrigerating cycle, so that $\eta=1 \ldots$ (Eq. 27) is realized in $\eta=\eta_S/(1-Q_3/Q) \ldots$ (Eq. 32), or $\eta$ is made as close to 1 as possible. In the present invention, the refrigerating cycle has a turbine installed upstream of a condenser in a refrigerating cycle in which a refrigerant is compressed by a compressor. Other objects of the present invention will be made apparent in the following description of the invention.

Means for Overcoming the Problem

A heat cycle system (basic cycle system) according to the present invention includes a compressor, a first turbine, first and second heat exchangers, a first pump, and an expander. Working gas compressed in the compressor (C) drives the first turbine (S). Thereafter, the working gas is cooled by passing through the heat dissipating side (71) of the first heat exchanger (7) and then raised in pressure by the pump (P) to form high-pressure working liquid (Fe). High-pressure working liquid (Fe) is expanded and evaporated in the expander (K, V) to form working gas (Fg). Working gas (Fg) is heated as it passes the heat receiving side (82) of the second heat exchanger and is thereafter introduced into the compressor. The heat dissipating side (81) of the second heat exchanger is comprised of a heat dissipating portion of the refrigerating machine or a waste-heat dissipating portion of a heating machine (30).

The heat cycle system of the present invention can include the following features: (1) the expander is a reaction water turbine (K); and high-pressure working liquid (Fe) drives the reaction water turbine (K) to output work ($W_2$), and is expanded and evaporated to form working gas (Fg); (2) working gas (Fg) is heated as it passes a heat receiving side (72) of the first heat exchanger and a heat receiving side (82) of the second heat changer, and is thereafter introduced to the compressor C; (3) the refrigerating machine is used for an air-conditioner, a refrigerator, or an ice-maker; (4) the expander is an expansion valve (V), and high-pressure working liquid (Fe) is expanded and evaporated through the expansion valve (V) to form working gas (Fg); (5) the waste-heat dissipating portion of the heating machine (30) is a heat dissipating portion for dissipating waste heat from a lubricant cooling system of the compressor, first turbine, first power generator (G), and a compressor drive motor; and (6) the heat cycle system includes an output terminal (11) for supplying electric power to the outside of the first power generator (G) that is driven by the first turbine (S); and a conducting wire (12) for electrically connecting the first power generator (G), the output terminal (11), a motor (M) for driving the compressor, and a motor ($M_2$) for driving the first pump.

The composite heat cycle system of the present invention comprises: a refrigerator (J) including a compressor, first and second heat exchangers, and an expander; and a steam engine (A) including a boiler, a second turbine, a condenser, a third power generator ($G_3$) driven by the second turbine, and a second pump. Working gas compressed in the compressor (C) is chilled as it passes a heat dissipating side (71) of a first heat exchanger (7) to form working liquid (Fe), which is expanded in an expansion valve (V) to form working gas (Fg), which is heated as it passes a heat receiving side (82) of a second heat exchanger, and is thereafter introduced to the compressor. Steam (Eg) generated by a boiler (B) is chilled as it passes a heat dissipating side (81) of a condenser (Y), after driving a second turbine ($S_2$), and is increased in pressure by a second pump ($P_2$) to form high-pressure condensate (Ee), which is heated as it passes a heat receiving side (73) of the first heat exchanger, and is thereafter brought back to the boiler (B). The heat receiving side of the condenser (Y) is comprised of the heat receiving side (82) of the second heat exchanger. The first heat exchanger can comprise a heat receiving portion (74) for feedwater.

The composite heat cycle system of the present invention comprises: a heat cycle system (basic cycle system) including a compressor, a first turbine, a first heat exchanger, a first pump, an expander, and a first power generator (G); and a steam engine including a boiler, a second turbine, a third power generator ($G_3$), a condenser, and a second pump. Working gas compressed in a compressor (C) is chilled as it passes a heat dissipating side (71) of a first heat exchanger (7), after driving a first turbine (S), and is thereafter increased in pressure by a first pump (P) to form high-pressure working liquid (Fe), which is expanded and evaporated in an expander (K, V) to form working gas (Fg), which is introduced to the compressor. Steam (Eg) generated by a boiler (B) is chilled by a condenser (Y), after driving a second turbine ($S_2$), and is increased in pressure by a second pump ($P_2$) to form high-pressure condensate (Ee), which is brought back to the boiler (B). The working gas is heated as it passes a heat receiving side (72) of the first heat exchanger and a heat receiving side (82) of the condenser (Y), and is thereafter is introduced to the compressor C.

The heat cycle system of the present invention can include the following features: (1) high-pressure condensate (Ee) is heated on a second heat receiving side (73) of the first heat exchanger or a heat receiving side (83) of the condenser (Y), before being brought back to the boiler (B); and (2) the heat cycle system further comprises: the first power generator (G); a third power generator ($G_3$) for converting work output from the second turbine ($S_2$) of the steam engine into electric power; an output terminal (11) for supplying electric power to the outside; and a conducting wire for electrically connecting the first power generator, the third power generator, and the output terminal (11). The electric power supply system of the present invention is characterized in that electric power generated by the composite heat cycle electric power generation system can be delivered through power lines to a power consumption area 500 km or more away.

The composite heat cycle system of the present invention comprises a combination of: a first heat cycle system including a compressor, a first turbine, first and second heat exchangers, a first pump, and an expander; and a second heat cycle system including a second compressor, a condenser, a second expander, and an evaporator. In the composite heat cycle system, working gas compressed in a compressor (C) is chilled as it passes a heat dissipating side (71) of a first heat exchanger (7), after driving a first turbine (S), and is thereafter increased in pressure by the first pump (P) to form high-pressure working liquid (Fe), which is expanded and evaporated in an expander (V) to form working gas (Fg), which is heated as it passes a heat absorbing side (82) of a second heat exchanger (8), and is thereafter brought back to the compressor. A refrigerant gas (8g) compressed in a second compressor ($C_2$) is chilled as it passes a condenser (81) to form a refrigerant liquid (8e), which is expanded in a second expander ($V_2$) and evaporated on a heat absorbing side (92) of an evaporator (9), while absorbing heat on a heat dissipating side (91) of the evaporator (9), so as to form a refrigerant gas (8g), which is brought back to the second compressor ($C_2$). The heat dissipating side (81) of the second heat exchanger comprises the condenser.

The composite heat cycle electric power generation system of the present invention comprises: a heat cycle system including a first compressor, a first turbine, a power generator, first and second heat exchangers, a first pump, an expander, and a first power generator; and an open-type gas turbine including a second compressor, a combustor, a second turbine, and a third power generator. In this electric power generation system, working gas (Fg) compressed in a compressor (C) is chilled as it passes a heat dissipating side (71) of a first heat exchanger (7), after driving a first turbine (S), and is thereafter increased in pressure by the first pump (P) to form high-pressure working liquid (Fe), which is expanded and evaporated in an expander (V) to form working gas (Fg), which is heated as it passes a heat receiving side (72) of the first heat exchanger and a heat receiving side (82) of the second heat exchanger, and is thereafter brought back to the compressor (C). Inlet air (34) is compressed in a second compressor ($C_2$) and is supplied to a combustor (35) in which fuel is mixed with compressed air and is ignited for combustion to generate combustion gas. After driving the second turbine ($S_2$), the combustion gas is reduced in temperature as it passes a heat dissipating side (81) of the second heat exchanger and is discharged as an exhaust gas (36) into the atmosphere, such that the first power generator (G) and the third power generator ($G_3$) are driven by the first and second turbines (S) and ($S_2$).

The power generating heat output facility of the present invention comprises: a heat cycle system including a compressor, a first turbine, a power generator driven by the first turbine, first and second heat exchangers, a first pump, and an expander and an electric boiler. In this power generating heat output facility, working gas (Fg) compressed in a compressor (C) is chilled as it passes a heat dissipating side (71) of a first heat exchanger (7), after driving a first turbine (S), and is thereafter increased in pressure by a first pump (P) to form high-pressure working liquid (Fe), which is expanded and evaporated in an expander (V) to form working gas (Fg), which is heated as it passes a heat receiving side (82) of the second heat exchanger, and is brought back to the compressor. Water (U) for heat output is heated on a heat receiving side (73) of the first heat exchanger (7) and is thereafter further heated by the electric boiler (15) to a predetermined temperature, and electric power generated by a power generator (G) driven by the first turbine is supplied to the electric boiler (15). Preferably, working gas is heated as it passes the heat receiving side (72) of the first heat exchanger (7) before passing the heat receiving side (82) of the second heat exchanger, and a heat dissipating side (81) of the second heat exchanger is comprised of a low-temperature chamber or a heat dissipating portion for waste heat.

EXPLANATION OF REFERENCE SYMBOLS

A: heat engine (Rankine cycle), B: boiler, C: compressor, E: performance coefficient, $\eta$: thermal efficiency of heat cycle system, $\eta_S$: thermal efficiency of turbine as used singly, Eg: steam, Ee: water (feedwater or condensate), Fg: refrigerant gas, Fe: refrigerant liquid, G, $G_2$, $G_3$: electric generator, J: heat cycle system (refrigerator, heat pump), K: water turbine, L, $L_2$: work (input), N: fuel cell, M, $M_2$: motor, P, $P_2$: pump, Q, $Q_2$, $Q_3$, $Q_4$: heat quantity, S, $S_2$: turbine, U: water, V: expansion valve, W, $W_2$, $W_3$: work (output), Y: condenser, 8: heat exchanger, 9: evaporator, 15: electric boiler, 30: heating machine, 31: heating machine body, 32: open-type gas turbine, 33: flue (processing device), 34: inlet air, 35: combustor, 36: exhaust gas, 41: cooling system, 71, 81, 91: heat dissipating side, 72, 73, 74, 82, 83: heat receiving side (heat absorbing side), 91, 93: shaft, 92: heat absorbing side, 94: connector

DETAILED DESCRIPTION OF THE INVENTION

Figure 1:
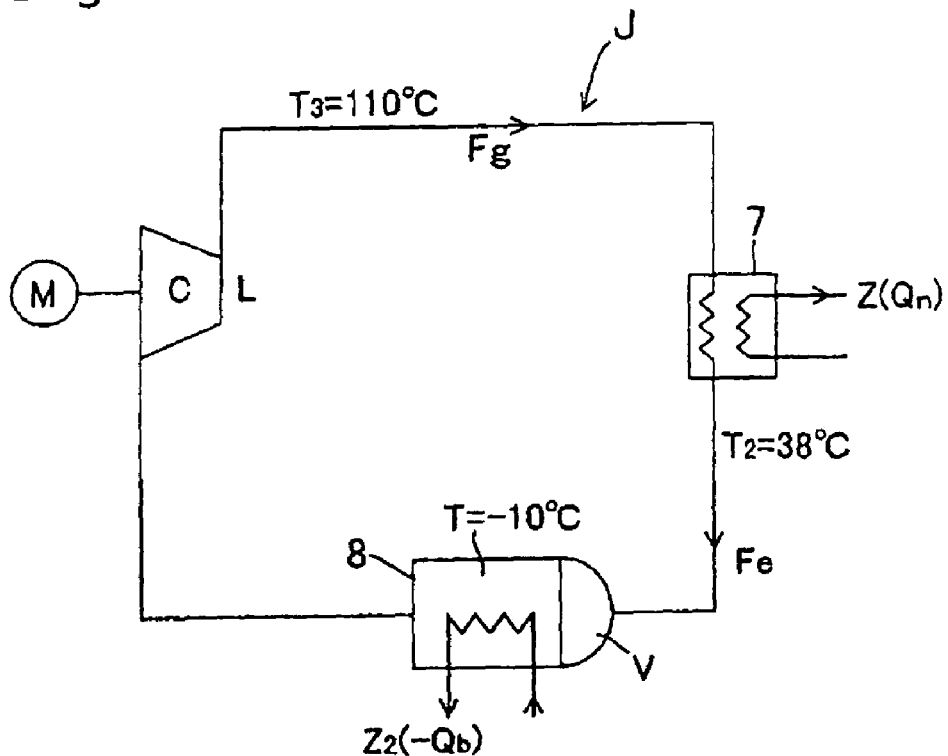
FIG. 1 is an arrangement plan showing constituent elements of a conventional refrigerator.
Figure 2:
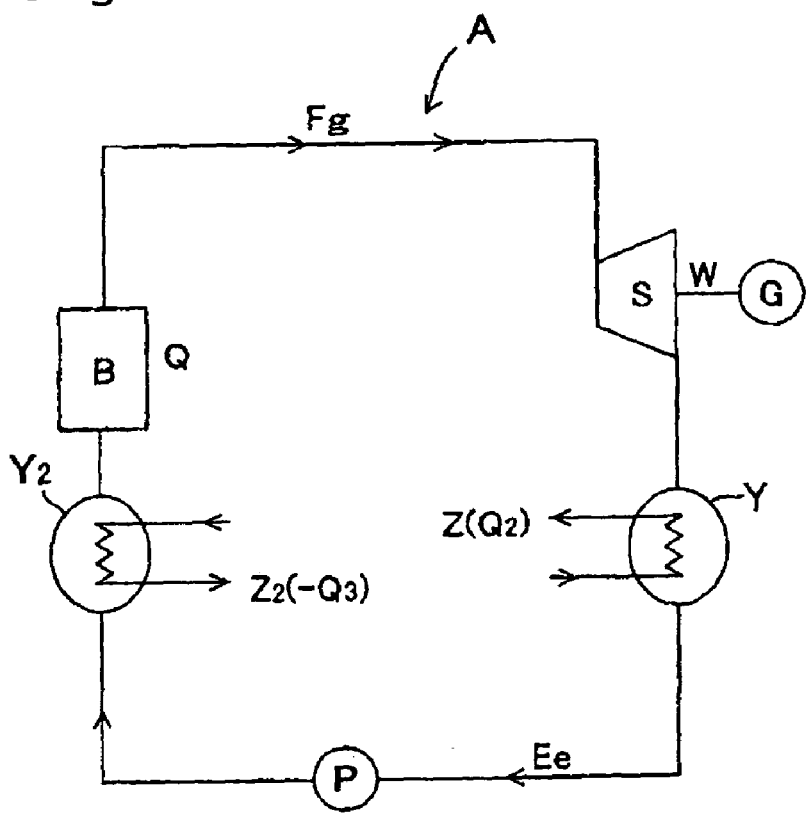
FIG. 2 is an arrangement plan showing basic constituent elements of a conventional heat engine including a turbine, i.e. a heat cycle system that performs a Rankine cycle.
Figure 3:
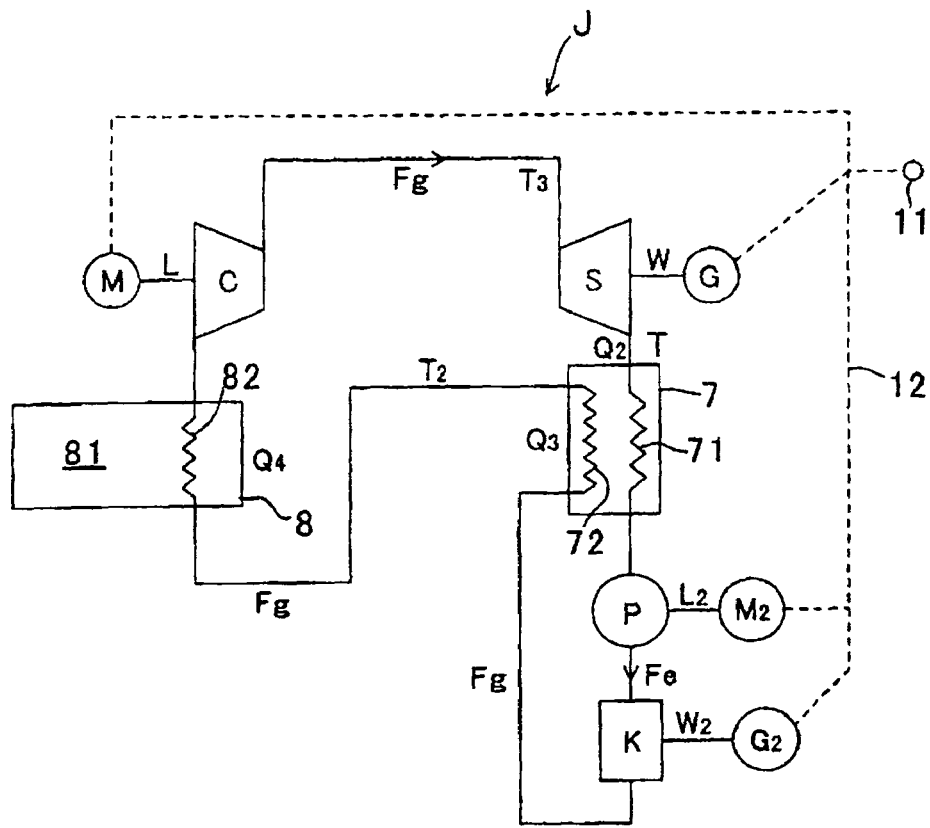
FIG. 3 is an arrangement plan of a heat cycle system according to a first embodiment of the present invention.

FIG. 3 is an arrangement plan of a heat cycle system J according to a first embodiment of the present invention. The heat cycle system J has an arrangement in which a turbine S and so forth are inserted into a refrigerator including a compressor C and a condenser. Working fluid (refrigerant gas Fg) compressed in the compressor C drives the turbine S to deliver work W. Thereafter, the working fluid is cooled and liquefied in a heat dissipating side 71 of a heat exchanger 7. A pump P connected to the outlet of the heat exchanger 7 sucks in the working liquid Fe and lowers the back pressure of the turbine S, thereby increasing the turbine output W and raising the pressure of the working liquid Fe. The working liquid Fe raised in pressure drives a reaction water turbine K to deliver work $W_2$. At the same time, the working liquid Fe is expanded by the reaction water turbine K that operates as an expansion valve. Thus, the working liquid Fe evaporates to form working gas (refrigerant gas Fg). The working gas Fg is heated in a heat absorbing side 72 of the heat exchanger 7 and further heated in a heat exchanger 8 before being introduced into the compressor C.

Figure 4:
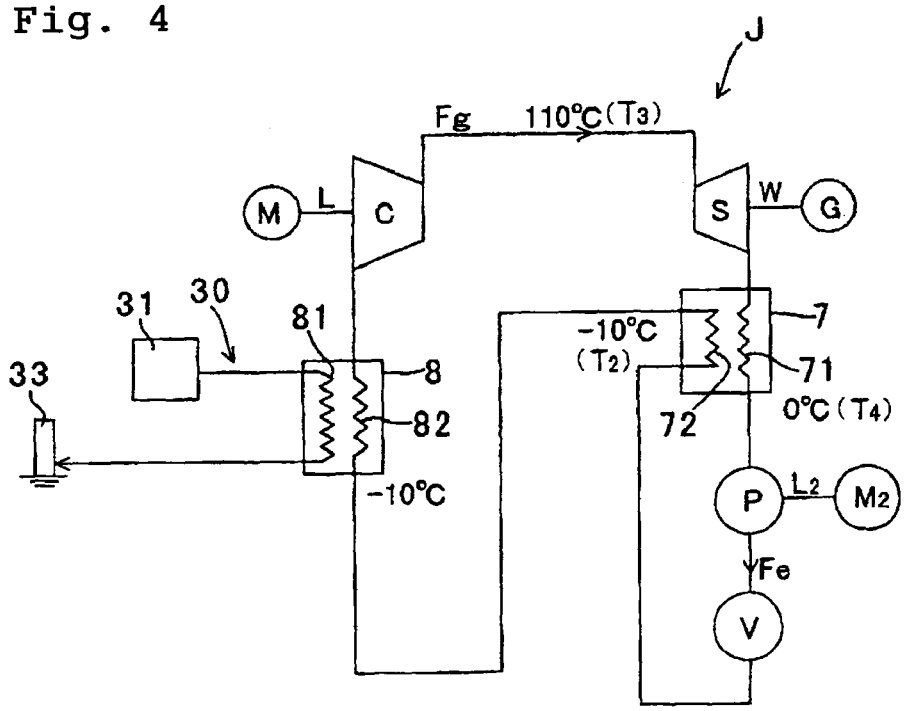
FIG. 4 is an arrangement plan of a heat cycle system according to a second embodiment of the present invention.
Figure 7:
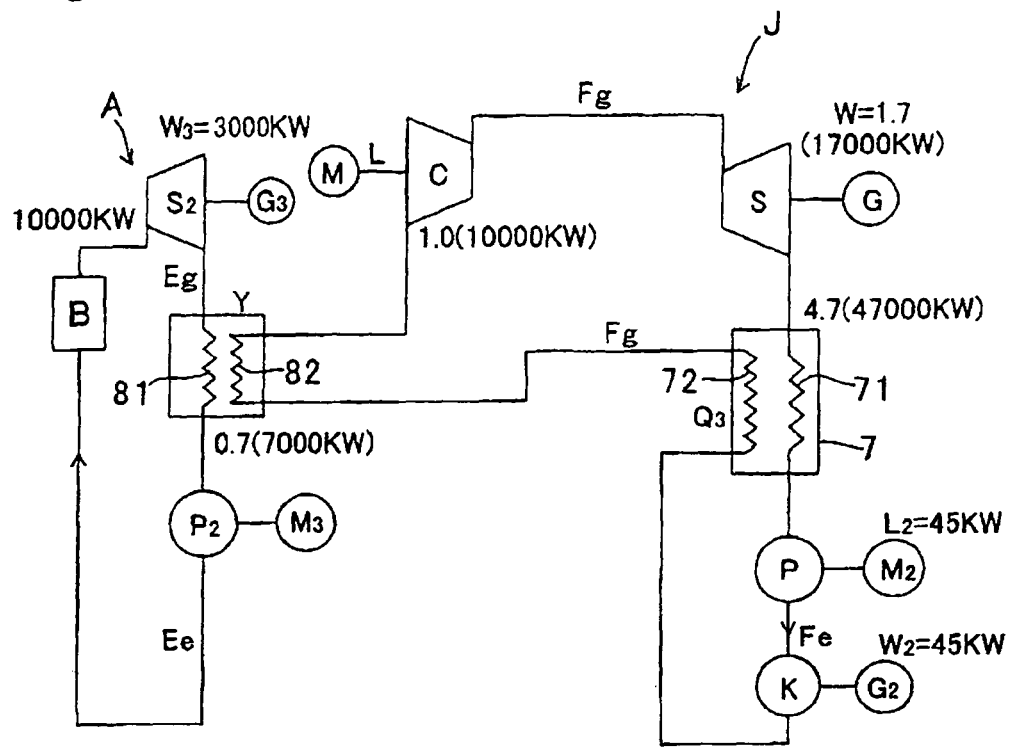
FIG. 7 is an arrangement plan of a composite heat cycle electric power generation system according to a fifth embodiment of the present invention.

In the heat cycle system J of FIG. 3, the heat exchanger 7 releases heat from the exhaust (refrigerant gas Fg) of the turbine S to heat the working gas at the outlet of the reaction water turbine K. On the heat dissipating side 71 of the heat exchanger 7, the exhaust from the turbine S is cooled and condensed to liquid. The heat dissipating side 71 of the heat exchanger 7 increases the temperature difference between the working fluid at the inlet of the turbine S and the working fluid at the outlet thereof by cooling the refrigerant gas Fg from the turbine S, thereby increasing the turbine output. Waste heat $Q_3$ from the working fluid in the outlet of the turbine S is transferred (heat crossing) to the working fluid at the downstream side of the reaction water turbine K. Working liquid Fe is raised in pressure by the pump P and is provided with a potential energy. The potential energy of working liquid Fe is recovered by the reaction water turbine K and is expanded to form a gas. In a case in which the compressor power is 10,000 kw, as shown in FIG. 7, the potential energy recovered by the reaction water turbine K amounts to 45 kw. Therefore, with the compressor power at about 10,000 kw, influence due to a change in thermal efficiency can be said to be small even if a relatively inexpensive expansion valve V is used as the reaction water turbine K, as shown in FIG. 4.

In the heat cycle system of FIG. 3, $Q_3$ is the quantity of heat transferred from the heat dissipating side 71 to the heat receiving side 72 of the heat exchanger 7, that is, the quantity of heat transferred (heat crossing) from the working fluid on the outlet side of the turbine S to the working fluid on the inlet side of the compressor C, and $Q_4$ is the quantity of heat transferred from the heat dissipating side 81 (outside) to the heat absorbing side 82 of the heat exchanger 8. The output W of the heat cycle system (the output of the turbine S) is given by:

$$(L+Q_4) \tag{Eq. 33}$$

A first generator G to convert W to electric power is electrically connected through a lead 12 to an output terminal 11.

In the heat cycle system of FIG. 3, the heat dissipating side 81 of the heat exchanger 8 comprises a heat dissipating portion of a refrigerating machine or a waste-heat dissipating portion of a heating machine. For example, the refrigerating machine, which is an air conditioner, a refrigerator, or an ice making machine, includes: a heat exchanger consisting of a refrigerant compressor and a heat dissipating side 81 of the heat exchanger 8 for cooling a compressed refrigerant; an expansion valve; and a heat absorbing portion. The heat absorbing portion decreases the temperature in the chamber where the heat absorbing portion is to be air-conditioned, a refrigerating chamber, or an ice making chamber. The heat dissipating side 81 of the heat exchanger 8 can comprise a waste-heat dissipating portion of the heating machine 30.

FIG. 4 is an arrangement plan of a heat cycle system J according to the second embodiment of the present invention in which the reaction water turbine K of the heat cycle system according to the first embodiment of the present invention is merely modified to form an expansion valve V. The arrangement plan also shows an example of temperature and pressure. The exhaust from a turbine S is cooled to 0° C. ($T_4$) by refrigerant vapor at −10° C. ($T_2$) in a condenser (the heat dissipating side 71 of the heat exchanger 7). Thereafter, the pressure of the refrigerant is raised from 4.39 kgf/cm²abs to 15.04 kgf/cm²abs by a pump p and thus liquefied. $T_4$ is the temperature of the refrigerant at the outlet of the condenser (heat dissipating side 71 of the heat exchanger) in FIG. 4. The refrigerant raised in pressure by the pump P is expanded and evaporated through the expansion valve V, and receives heat of $Q_3$ on the heat absorbing side 72 of the heat exchanger 7 to reach a temperature of −10° C. ($T_2$). The turbine inlet temperature is 110° C. ($T_3$), and the condenser outlet refrigerant temperature is 0° C. ($T_4$). Therefore, the turbine efficiency $\eta_S$ on the Carnot cycle is:

$$\eta_s = (T_3 - T_4)/T_3 \tag{Eq. 34}$$
$$= (110 - 0)/(273.15 + 110) \approx 0.28$$

The heat dissipating side 81 of the heat exchanger 8 in the heat cycle system of FIG. 4 comprises a waste-heat dissipating portion of the heating machine 30. Specifically, the heating machine 30 has: a heat exchanger body 31; a heat exchanger consisting of a heat dissipating side 81 of the heat exchanger 8 for discharging waste heat from the exhaust gas; and an exhaust gas processing device or a flue 33. However, as in the case of FIG. 3, the heat dissipating side 81 of the heat exchanger 8 in the heat cycle system of FIG. 4 can comprise a heat dissipating portion of a refrigerating machine.

Figure 5:
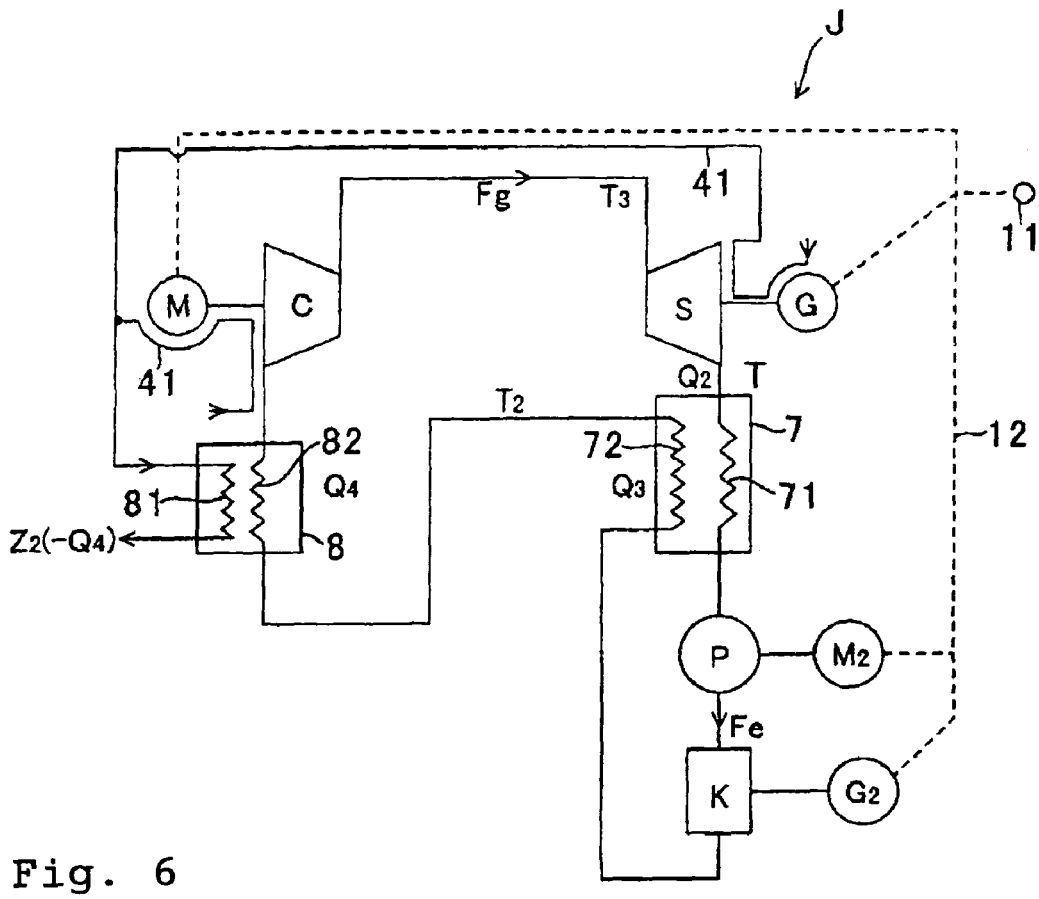
FIG. 5 is an arrangement plan of a heat cycle system according to a third embodiment of the present invention.

FIG. 5 is an arrangement plan of the heat cycle system J according to the third embodiment of the present invention. In the heat cycle system shown in FIG. 5, the heat dissipating side 81 of the heat exchanger 8 in the heat cycle system according to the first embodiment (FIG. 3) of the present invention is modified to form a heat dissipating portion for dissipating waste heat from an instrument comprising the heat cycle system itself such as waste heat from a cooling system 41 of a compressor or a turbine or waste heat from a lubricating system (not shown). The cooling waste heat from the compressor includes waste heat from cooling oil or lubricant for the compressor or waste heat generated due to cooling of the compressor body. The rest of the structure of the embodiment of FIG. 5 is the same as that of the heat cycle system according to the first embodiment of FIG. 3; therefore, the description is omitted. In the heat cycle system of the embodiment of FIG. 5, waste heat from an instrument that is a component of the system is recovered by the heat exchanger 8, input heat quantity to the heat cycle system is reduced by the recovered amount.

Figure 6:
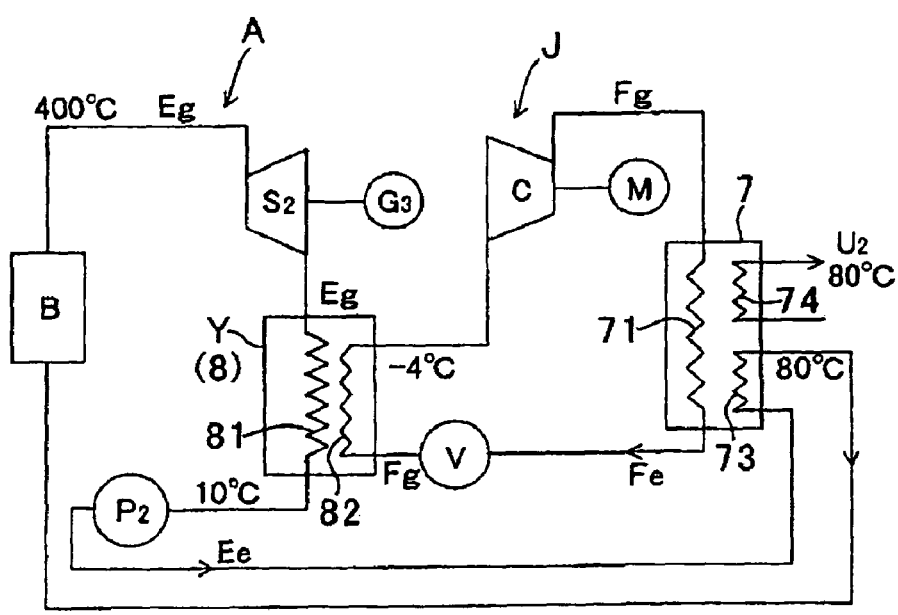
FIG. 6 is an arrangement plan of a composite heat cycle electric power generation system according to a fourth embodiment of the present invention.

FIG. 6 is an arrangement plan of a composite heat cycle system according to the fourth embodiment of the present invention. The composite heat cycle system of FIG. 6 comprises: a refrigerator (heat pump) J including a compressor C, first and second heat exchangers 7 and 8, and an expander V; and a steam engine A including a boiler B, a second turbine $S_2$, condenser Y, a third power generator $G_3$ driven by the second turbine $S_2$, and a second pump $P_2$. The second heat exchanger 8 comprises a condenser Y of the steam engine A. In the composite heat cycle system, the working gas Fg compressed in the compressor C is chilled as it passes the heat dissipating side 71 of the first heat exchanger 7, so as to form working liquid Fe, which is in turn expanded in the expansion valve V to form low-temperature working gas Fg, which is in turn heated as it passes the heat receiving side 82 of the condenser Y, and is thereafter introduced to the compressor C.

In the composite heat cycle system according to the fourth embodiment of the present invention shown in FIG. 6, steam Eg generated by the boiler B is chilled as it passes the heat dissipating side 81 of the condenser Y, after driving the second turbine $S_2$, and is increased in pressure by the second pump $P_2$ to form high-pressure condensate Ee, which is brought back to the boiler B, after being heated as it passes the heat receiving side 73 of the first heat exchanger. The first heat exchanger 7 includes a heat receiving portion 74 for feedwater, so as to supply, for example, water $U_2$ heated to 80° C. to the outside. As a heat source for the heat cycle system according to the first embodiment (FIG. 3) of the present invention, the composite heat cycle system of FIG. 6 uses waste heat from the steam engine A with a Rankine cycle, that is, waste heat from the condenser Y of the steam turbine $S_2$.

FIG. 7 is an arrangement plan of a composite heat cycle system according to the fifth embodiment of the present invention. The composite heat cycle system of FIG. 7 comprises: a refrigerator (heat pump) J including a compressor C, a first turbine S, a first heat exchanger 7, a first pump P, a water turbine K, and a first power generator G; and a Rankine heat engine A including a boiler B, a second turbine $S_2$, a third power generator $G_3$, a condenser Y, and a second pump $P_2$. Working gas Fg compressed in the compressor C is chilled as it passes the heat dissipating side 71 of the first heat exchanger 7 after driving the first turbine S, and is thereafter increased in pressure by the first pump P to form high-pressure working liquid Fe, which is expanded and evaporated in the water turbine K to form working gas Fg, which is heated as it passes the heat receiving side 72 of the first heat exchanger 7 and the heat receiving side $S_2$ of the condenser Y, and is thereafter introduced to the compressor. After driving the second turbine $S_2$, the steam Eg generated by the boiler B is chilled in the condenser Y and is increased in pressure by the second pump $P_2$ to form high-pressure condensate Ee, which is brought back to the boiler B. Working gas Fg is introduced to the compressor C after being heated as it pass the heat receiving side 72 of the first heat exchanger and the heat receiving side 82 of the condenser Y.

In the composite heat cycle system of FIG. 6, one example of an operation of the heat engine carried out in a state where the heat pump J is at rest (i.e. heat exchange is effected directly between the exhaust steam Eg and the condensate Ee in the heat engine) is as follows. The steam temperature (turbine inlet) is 400° C., and the condensate temperature (turbine outlet) is 60° C. The thermal efficiency η on the Carnot cycle is:

$$\eta=(400-60)/(400+273.15)\approx0.505 \quad \text{(Eq. 45)}$$

On the other hand, when the heat pump J is operated as shown in FIG. 6 with the steam temperature set at 400° C., the condensate temperature (turbine outlet) is 10° C. The thermal efficiency η on the Carnot cycle is:

$$\eta\approx0.579 \quad \text{(Eq. 46)}$$

This shows that operating the heat pump in the composite heat cycle system of FIG. 6 causes the temperature difference to increase from 340° C. to 390° C. and allows the thermal efficiency of the turbine main unit to increase by:

$$0.579-0.505=0.074 \quad \text{(Eq. 47)}$$

Next, let us discuss the heat crossing in the heat cycle system of FIG. 6. When the heat pump J is at rest and no heat crossing is available, the condensate temperature (turbine outlet) and the feedwater temperature (boiler inlet) are both 10° C. In order to transform the condensate and the feedwater into steam at 400° C., 90 units of quantity of heat are required to heat the feedwater from 10° C. to 100° C., and 539 units of quantity of heat is required to transform the condensate at 100° C. into steam at 100° C. Further, 150 units of quantity of heat is required to heat the steam from 100° C. to 400° C. on the assumption that the specific heat of steam is 0.5. Accordingly, a total of 779 units of quantity of heat is required.

In a case where the heat pump is operated to effect heat crossing, the condensate temperature (turbine outlet) is 10° C., and the feedwater temperature at the boiler inlet is 70° C. Therefore, as compared to the boiler inlet feedwater temperature when no heat crossing is effected, i.e. 10° C., it is possible to save a quantity of heat which would otherwise be required to raise the feedwater temperature by 60° C., i.e. 60 units of quantity of heat. This is expressed as follows:

$$60/779=0.077 \quad \text{(Eq. 48)}$$

Therefore, the reduction in the input heat quantity by heat crossing improves the thermal efficiency of the heat cycle system of FIG. 6 as follows.

From the above Eq. 32, $$\eta=\eta_S/(1-Q_3/Q) \quad \text{(Eq. 32), i.e.}$$

$$\eta/\eta_S=1/(1-Q_3/Q) \quad \text{(Eq. 49)}$$

the thermal efficiency of the heat cycle system is:

$$1\div(1-0.077)=1.08 \quad \text{(Eq. 50)}$$

Thus, the thermal efficiency improves by approximately 8%.

Next, let us discuss the increase of heat drop due to heat crossing in the heat cycle system of FIG. 6. The thermal efficiency $\eta_S$ of the turbine when the heat pump J is at rest and no heat crossing is available is:

$$\eta_S=(400-10)/(400+273.15)=0.579 \quad \text{(Eq. 51)}$$

Multiplying the thermal efficiency $\eta_S$, i.e. 0.579, by the above-described increase rate of the thermal efficiency finds that the thermal efficiency of the heat cycle system is 0.625.

In the composite heat cycle device of FIG. 6, the thermal efficiency can be improved by effecting heat crossing in the Rankine cycle even if the power consumed by the pump and the work generated from the turbine cancel each other or the power balance is somewhat positive. The improvement in the thermal efficiency can be attained without the need to increase the boiler capacity. For example, the steam temperature of 400° C., the condensate temperature (turbine outlet) of 60° C. and the boiler inlet feedwater temperature of 60° C. in the conventional system change to a steam temperature of 400° C., a condensate temperature (turbine outlet) of 10° C. and a boiler inlet feedwater temperature of 70° C., as stated above. Thus, the boiler inlet feedwater temperature only changes by 10° C. Accordingly, it is unnecessary to increase the boiler capacity.

FIG. 7 shows an example of an arrangement of the composite heat cycle system of the heat pump J and the Rankine cycle heat engine A and heat quantities added to and extracted from the working fluid. In the composite heat cycle system of FIG. 7, the quantity of heat given to steam from a boiler B is 10,000 kW, and the output $W_3$ of the turbine $S_2$ is 3,000 kW (thermal efficiency: 0.3). Waste heat (condenser waste heat) from the turbine $S_2$ is 7,000 kW. The quantity of heat transferred from the steam Eg to the refrigerant Fg in the condenser Y is 7,000 kW.

When the input L of the compressor C is thrown into each element of the heat pump J on the right side of FIG. 7 in the amount of one unit (L=1), the output W of the turbine S, the heat crossing quantity $Q_3$ at the outlet of the heat exchanger 7, and the heat quantity $Q_4$ taken into the heat exchanger 8 from the outside can be expressed as below. The performance coefficient $\epsilon_h$ of the heat pump is the refrigerator performance coefficient plus 1, i.e.

$$\epsilon_h = 5.4 + 1 = 6.4 \quad \text{(Eq. 52)}$$

The output W of the turbine S is given by:

$$W = \epsilon_h \times \eta_S = 6.4 \times 0.28 \approx 1.7 \quad \text{(Eq. 53)}$$

The heat crossing quantity $Q_3$ at the outlet of the heat exchanger 7 is:

$$Q_3 = 6.4 - 1.7 = 4.7 \quad \text{(Eq. 54)}$$

The heat quantity $Q_4$ absorbed from the outside in the heat exchanger 8 is:

$$Q_4 = \text{refrigerator performance coefficient} - Q_3 \quad \text{(Eq. 54)}$$

Therefore, the heat quantity $Q_4$ is:

$$Q_4 = 5.4 - 4.7 = 0.7 \quad \text{(Eq. 56)}$$

Assuming that the quantity of heat transferred in the condenser Y of the composite heat cycle system of FIG. 7 is 7,000 kW, as described above, the quantity of heat coming into and out of each element of the heat cycle system J is obtained by a proportional calculation in which the quantity of absorbed heat 0.7 is assumed to be 7000 kW, that is, one unit in FIG. 7 is assumed to be 10,000 kW. The input L of the compressor C is L=10,000 kW, and the work W of the turbine S is W=17,000 kW. The heat crossing quantity $Q_3$ in the heat exchanger 7 is $Q_3$=47,000 kW. The power $L_2$ consumed by the pump P is 45 kW, and the power $W_2$ generated by the water turbine K is 45 kW.

Figure 8:
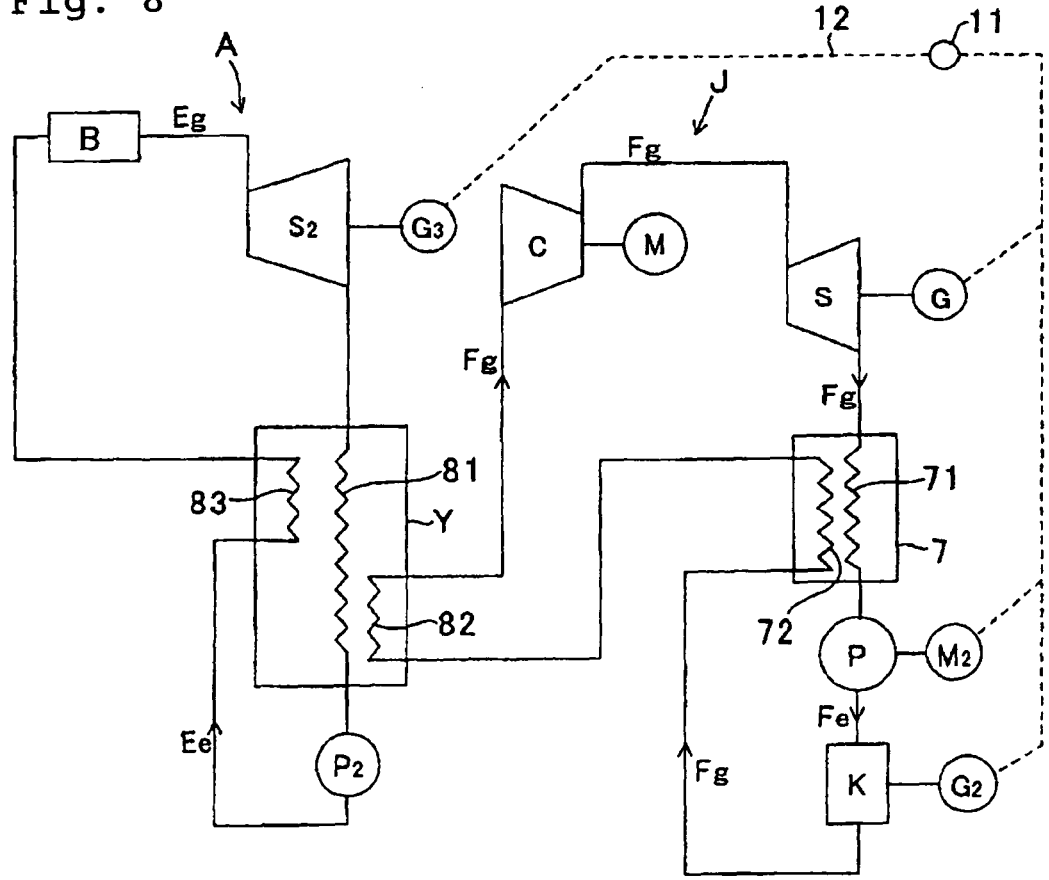
FIG. 8 is an arrangement plan of a composite heat cycle electric power generation system according to a sixth embodiment of the present invention.

FIG. 8 is an arrangement plan of a composite heat cycle system according to the sixth embodiment of the present invention. The composite heat cycle system of FIG. 8 comprises: a heat pump J including a compressor C, a first turbine S, a first heat exchanger 7, a first pump P, a water turbine K, and a first power generator G; and a Rankine cycle heat engine A including a boiler B, a second turbine $S_2$, a third power generator $G_3$, a condenser Y, and a second pump $P_2$. Working gas Fg compressed in the compressor C is chilled as it passes the heat dissipating side 71 of the first heat exchanger 7, after driving the first turbine S, and is thereafter increased in pressure by the first pump P to form high-pressure working liquid Fe, which is expanded and evaporated in the water turbine K to form working gas Fg, is heated as it passes the heat absorbing side 72 of the first heat exchanger 7 and the heat receiving side 82 of the condenser Y, and is thereafter introduced to the compressor C. The steam Eg generated by the boiler B is chilled by the condenser Y, after driving the second turbine $S_2$, is increased in pressure by the pump $P_2$ to form high-pressure condensate Ee, is heated as it passes the heat absorbing side 83 of the condenser Y, and is brought back to the boiler B. The composite heat cycle system shown in FIG. 8 comprises a combination of a heat engine A that per se performs heat crossing, and a heat pump (refrigerator J) including a turbine, wherein the turbine exhaust in the heat engine A is cooled by the refrigeration output of the refrigerator J.

Figure 9:
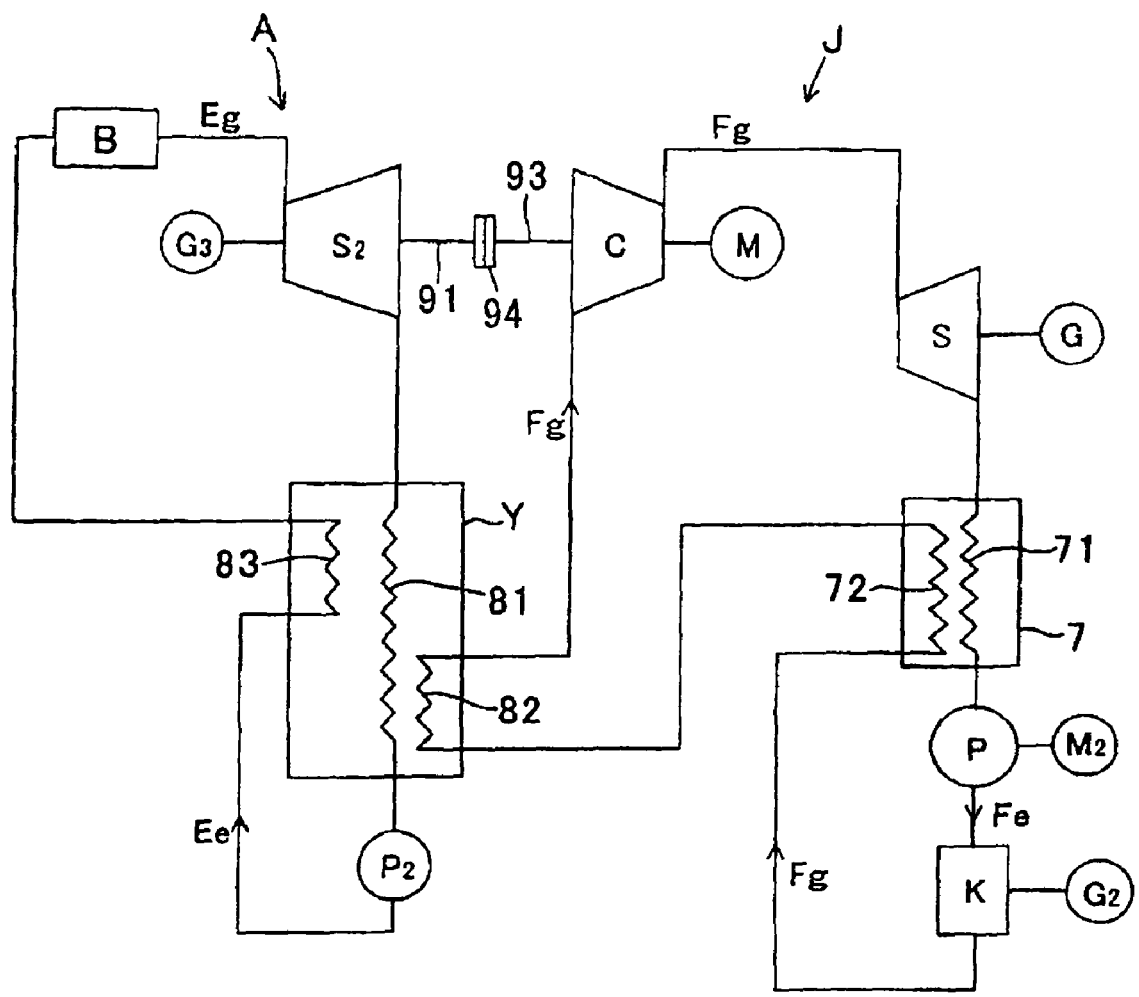
FIG. 9 is an arrangement plan of a composite heat cycle electric power generation system according to a seventh embodiment of the present invention.

FIG. 9 is an arrangement plan of a composite heat cycle system according to the seventh embodiment of the present invention. In the composite heat cycle system of FIG. 9, a shaft 91 of the second turbine $S_2$ and a shaft 93 of the compressor C are connected by a connector 94, such that the compressor can be driven by a mechanical output from the second turbine $S_2$. Otherwise, this embodiment is the same as that shown in FIG. 8.

In the composite heat cycle system of FIGS. 7 to 9, the condenser Y of the Rankine cycle heat engine A is chilled by a refrigerator or a heat cycle system J, so as to reduce the temperature of the output of the second turbine $S_2$, which makes it possible to obtain a turbine output with a high thermal efficiency. Since the composite heat cycle system is capable of chilling the condenser Y without sea water, the composite heat cycle system can be disposed in a fuel producing area that is remote from a coast. The composite heat cycle system of FIGS. 7 to 9 can improve its power generation efficiency to about a value 1.9 times that of a conventional thermal power plant. Therefore, a power supply system using the composite heat cycle system of FIGS. 7 to 9 is capable of delivering electric power generated by the composite heat cycle electric power generation system, to a power consumption area more than 500 km away via power lines.

Figure 10:
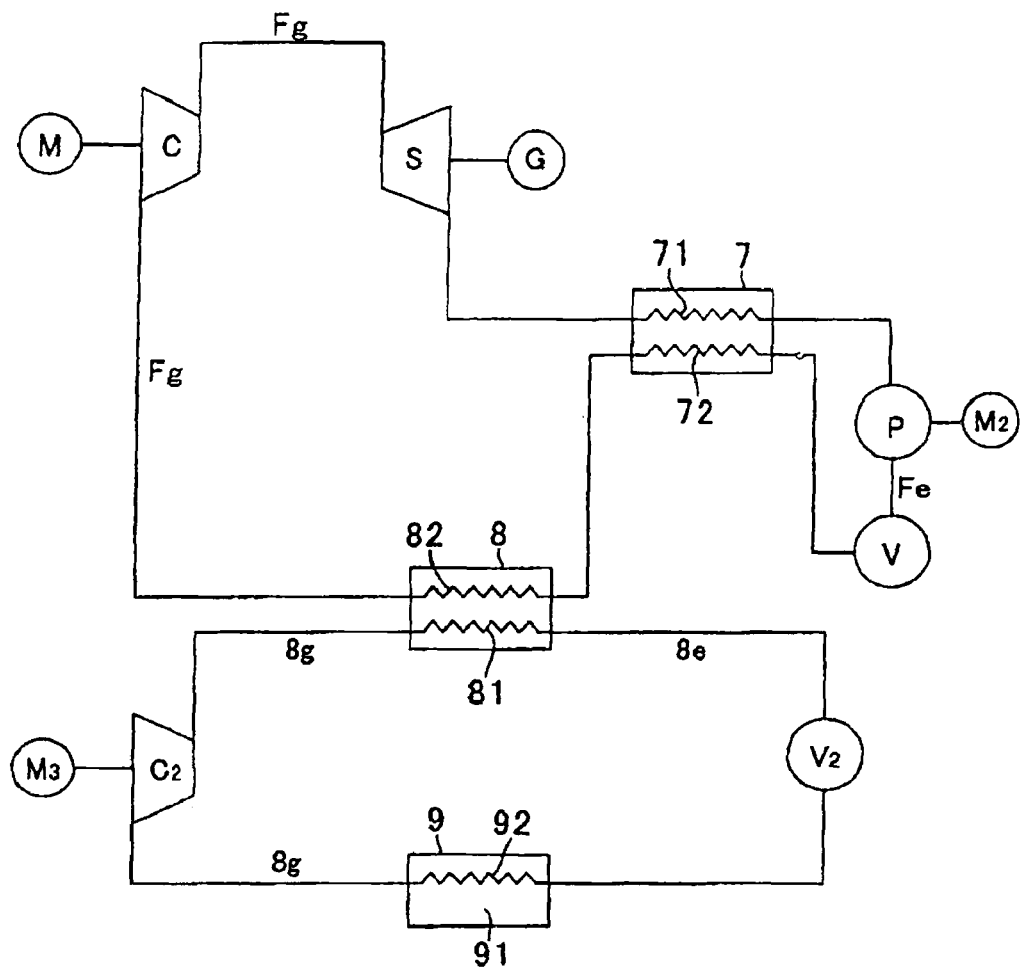
FIG. 10 is an arrangement plan of a composite heat cycle system according to an eighth embodiment of the present invention.

FIG. 10 is an arrangement plan of a composite heat cycle system according to the eighth embodiment of the present invention. The composite heat cycle system of FIG. 10 comprises a combination of: a first heat cycle system including a compressor C, a first turbine S, a first heat exchanger 7, a second heat exchanger 8, a first pump P, and an expander V; and a second heat cycle system including a second compressor $C_2$, a condenser 81, a second expander $V_2$, and an evaporator 92. In the composite heat cycle system of FIG. 10, working gas Fg compressed in the compressor C is chilled as it passes the heat dissipating side 71 of the first heat exchanger 7, after driving the first turbine S, and is thereafter increased in pressure by the first pump P to form high-pressure working liquid Fe, which is expanded and evaporated in the expander V to form working gas Fg, which is heated as it passes the heat receiving side 72 of the first heat exchanger 7 and the heat receiving side 82 of the second heat exchanger 8, and is brought back to the compressor C.

A refrigerant gas 8g compressed in the second compressor $C_2$ is chilled as it passes the condenser 81, so as to form a refrigerant liquid 8e, which is expanded in the second expander $V_2$ and evaporated on the heat absorbing side 92 of the evaporator 9, while absorbing heat on the heat dissipating side 91 of the evaporator 9, so as to form a refrigerant gas 8g, which is brought back to the second compressor $C_2$. The condenser 81 comprises the heat dissipating side 81 of the second heat exchanger. The composite heat cycle system of FIG. 10 has two refrigerating cycles that are disposed in series, such that the heat dissipating side of the second heat cycle system can be chilled on the heat absorbing side of the first heat cycle system; thus, the low heat portion of the second heat cycle system, namely, the heat dissipating side 91 of the evaporator 9 can be chilled to an extremely low temperature. Therefore, the low heat portion of the composite heat cycle system of FIG. 10 can serve as a low heat source of a gas liquefier for liquefying, for example, LNG or LPG.

Figure 11:
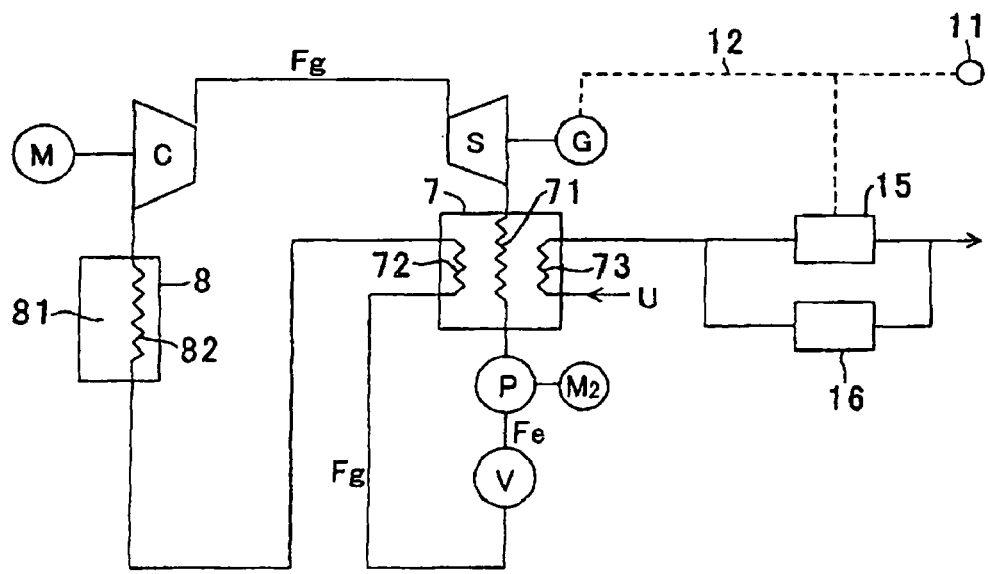
FIG. 11 is an arrangement plan of a composite heat cycle system according to a ninth embodiment of the present invention.

FIG. 11 is an arrangement plan of a power generating heat output facility that is a composite heat cycle system according to the ninth embodiment of the present invention. The power generating heat output facility of FIG. 11 comprises: a heat cycle system including a compressor C, a first turbine S, a power generator G driven by the first turbine, a first heat exchanger 7, a second heat exchanger 8, a first pump P and an expander V; an electric boiler 15; and a fossil fuel boiler 16. In the power generating heat output facility of FIG. 11, working gas Fg compressed in the compressor C is chilled and liquefied as it passes the heat dissipating side 71 of the first heat exchanger 7, after driving the first turbine S, and is thereafter increased in pressure by the first pump P to form high-pressure working liquid Fe, which is expanded and evaporated in the expander V to form working gas Fg. This working gas is heated as it passes the heat receiving side 72 of the first heat exchanger 7 and the heat receiving side 82 of the second heat exchanger and is then brought back to the compressor. Water U for heat output is heated on the heat receiving side 73 of the first heat exchanger 7, is thereafter further heated to a predetermined temperature by the electric boiler 15, and is supplied to a required portion. The electric boiler 15 is supplied with electric power generated by the power generator G, which is driven by the first turbine S. The heat dissipating side 81 of the second heat exchanger 8 can comprise a low-temperature chamber or a waste-heat dissipating portion.

Figure 12:
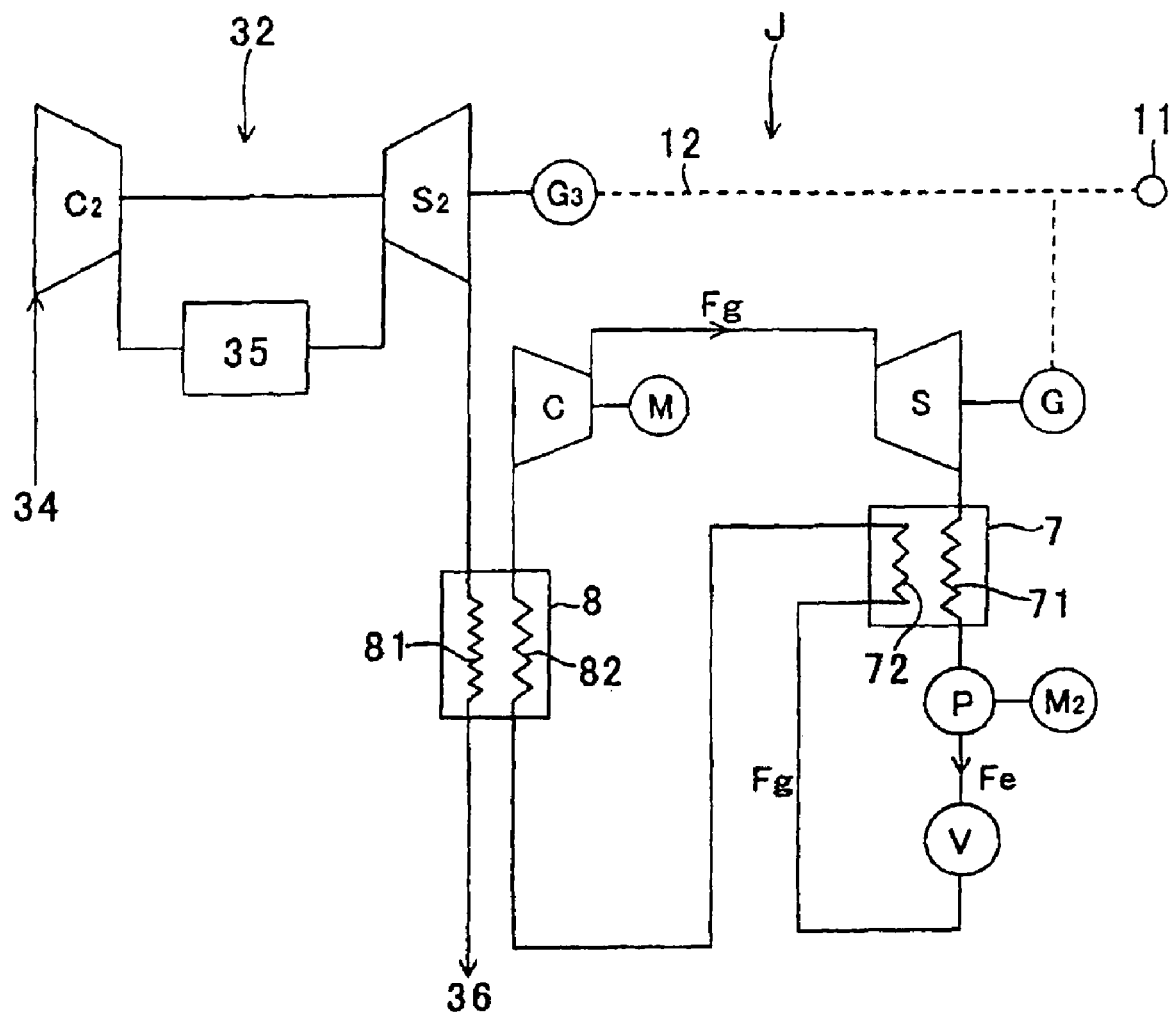
FIG. 12 is an arrangement plan of a composite heat cycle system according to a tenth embodiment of the present invention.

FIG. 12 is an arrangement plan of a composite heat cycle electric power generation system, which is a composite heat cycle system according to the tenth embodiment of the present invention. The composite heat cycle electric power generation system of FIG. 12 comprises: a heat cycle system J including a compressor C, a first turbine S, a first power generator G driven by the first turbine, a first heat exchanger 7, a second heat exchanger 8, a first pump P and an expander; and an open-type gas turbine 32 including a second compressor $C_2$, a combustor 35, a second turbine $S_2$, and a third power generator. In the composite heat cycle electric power generation system of FIG. 12, working gas Fg compressed in the compressor C is chilled and liquefied as it passes the heat dissipating side 71 of the first heat exchanger 7, after driving the first turbine S, and is thereafter increased in pressure by the first pump P to form high-pressure working liquid Fe, which is expanded and evaporated in the expander V to form working gas Fg, which is heated as it passes the heat receiving side 72 of the first heat exchanger 7 and the heat receiving side 82 of the second heat exchanger and is thereafter brought back to the compressor C. On the other hand, inlet air 34 is compressed in the second compressor $C_2$ and is supplied to the combustor 35, such that it is mixed with fuel in the combustor 35 and is ignited for combustion to generate combustion gas. After driving the second turbine $S_2$, the generated combustion gas is reduced in temperature as it passes the heat dissipating side 81 of the second heat exchanger, and is released as an exhaust gas into the atmosphere. Electric power, which is generated by the first and third power generator G and $G_3$ driven by the first and second turbine S and $S_2$, is supplied to a desired place.

The composite heat cycle electric power generation system of FIG. 12 generates electric power by introducing exhaust heat in the open-type gas turbine 32 to an incoming heat portion (the heat absorbing side 82 of the second heat exchanger) of the heat cycle system J. The heat cycle system J can use low-temperature waste heat. Therefore, the heat cycle electric power generation system of FIG. 12 can broaden the temperature range for use of the open-type gas turbine, to a low temperature side and can also improve thermal efficiency by enlarging a heat drop of the open-type gas turbine. The composite heat cycle electric power generation system of FIG. 12 does not require a cooling-water source and therefore can be placed in a desert area or the like.

Unlike a conventional electric power generation system, no heat energy is wasted when electric power is generated by the present invention; therefore, heat output (heated water or steam) can be obtained, without any waste, by an electric heater (electric boiler) using this electric power. The present invention uses heat recovered from waste heat by the heat pump to heat the electric boiler and is therefore capable of providing a useful high-temperature heat output.

The invention claimed is:

1. A power generating plant comprising:
   a heat cycle system which includes a compressor, a first turbine, first and second heat exchangers, a pump and an expander;
   a power generator driven by the first turbine;
   an output terminal for supplying electric power to the outside;
   a first motor for driving the compressor;
   a second motor for driving the pump; and
   a wire arranged so as to electrically connect the power generator, the output terminal, the first motor and the second motor,
   wherein working gas compressed in the compressor drives the first turbine and is thereafter cooled by passing through a heat dissipating side of the first heat exchanger and then raised in pressure by the pump to form high-pressure working liquid, the high-pressure working liquid is expanded and evaporated in the expander to form working gas, the working gas is heated by passing through a heat absorbing side of the second heat exchanger before being introduced into the compressor, and a heat dissipating side of the second heat exchanger is comprised of a low-temperature chamber or a waste-heat dissipating portion of a heating machine.

2. The power generating plant according to claim 1, wherein said expander is a reaction water turbine, the high-pressure working liquid drives the reaction water turbine to deliver work while being expanded and evaporated to form the working gas, and wherein the working gas is heated by passing through a heat receiving side of the first heat exchanger and through the heat absorbing side of the second heat exchanger before being introduced into the compressor.

3. The power generating plant according to claim 1, wherein said expander is an expansion valve and the high-pressure working liquid is expanded and evaporated through the expander to form the working gas.

4. The power generating plant according to claim 1, wherein said low-temperature chamber is an air-conditioned chamber, a refrigerator, or an ice-making chamber.

5. The power generating plant according to claim 1, wherein the waste-heat dissipating portion of the heating machine is a waste-heat dissipating portion of a lubricant cooling system of the compressor, the first turbine, the power generator, and the first motor.

6. A composite heat cycle electric power generation system comprising:
   a refrigerator including a compressor, first and second heat exchangers, and an expansion valve; and
   a steam engine including a boiler, a turbine, a condenser, a pump and a power generator driven by the turbine, wherein working gas compressed in the compressor is chilled as it passes a heat dissipating side of the first heat exchanger to form working liquid, which is expanded in the expansion valve to form working gas, which is heated as it passes a heat receiving side of the second heat exchanger, and is thereafter introduced to the compressor, and wherein steam generated by the boiler is, after driving the turbine, chilled and condensed as it passes a heat dissipating side of the condenser, and is increased in pressure by the pump to form high-pressure condensate, which is heated as it passes a heat receiving side of the first heat exchanger, and is brought back to the boiler, and wherein a first heat receiving side of the condenser is comprised of the heat receiving side of the second heat exchanger.

7. A composite heat cycle electric power generation system according to claim 6, wherein the first heat exchanger comprises a heat receiving portion for feedwater.

8. A composite heat cycle electric power generation system comprising:
a heat cycle system including a compressor, a first turbine, a heat exchanger, a first pump, an expander, and a first power generator; and
a steam engine including a boiler, a second turbine, a second power generator, a condenser, and a second pump,
wherein working gas compressed in the compressor is chilled as it passes a heat dissipating side of the heat exchanger, after driving the first turbine, and is thereafter increased in pressure by the first pump to form high-pressure working liquid, which is expanded and evaporated in the expander to form working gas, which is introduced to the compressor,
wherein steam generated by the boiler is chilled by the condenser, after driving the second turbine, is increased in pressure by the second pump to form high-pressure condensate, and is brought back to the boiler, and
wherein the working gas is heated as it passes a heat receiving side of the heat exchanger and a heat receiving side of the condenser, and is thereafter introduced to the compressor, such that the first power generator is driven by the first turbine and that the second power generator is driven by the second turbine.

9. A composite heat cycle electric power generation system comprising:
a heat cycle system including a first compressor, a first turbine, a first power generator, first and second heat exchangers, a pump, and an expander; and
an open-type gas turbine including a second compressor, a combustor, a second turbine, and a second power generator,
wherein working gas compressed in the first compressor is chilled as it passes a heat dissipating side of the first heat exchanger, after driving the first turbine, and is thereafter increased in pressure by the pump to form high-pressure working liquid, which is expanded and evaporated in the expander to form working gas, which is heated as it passes a heat receiving side of the first heat exchanger and a heat receiving side of the second heat exchanger, and is thereafter brought back to the compressor,
wherein inlet air is compressed in the second compressor and is supplied to the combustor, in which fuel is mixed with compressed air and ignited for combustion to generate combustion gas, which after driving the second turbine is reduced in temperature through a heat dissipating side of the second heat exchanger and is released as an exhaust gas to the atmosphere, and wherein the first and second power generators are driven by the first and second turbines, respectively.

10. The composite heat cycle electric power generation system according to claim 8, further comprising:
an output terminal for supplying electric power to the outside; and
a conducting wire for electrically connecting the first and second power generators and the output terminal.

11. A power supply system according to claim 8, wherein electric power generated by the composite heat cycle electric power generation system is delivered through power lines to a power consumption area 500 km or more away.

12. A composite heat cycle system comprising:
a first heat cycle system including a first compressor, a turbine, first and second heat exchangers, a pump, and a first expander; and
a second heat cycle system including a second compressor, a condenser, a second expander, and an evaporator,
wherein working gas compressed in the first compressor is chilled as it passes a heat dissipating side of the first heat exchanger, after driving the first turbine, and is thereafter increased in pressure by the pump to form high-pressure working liquid, which is expanded and evaporated in the first expander to form working gas, which is heated as it passes a heat receiving side of the second heat exchanger, and is thereafter brought back to the first compressor,
wherein a refrigerant gas compressed in the second compressor is chilled as it passes the condenser to form a refrigerant liquid, which is expanded in the second expander and evaporated on a heat absorbing side of the evaporator, while absorbing heat on a heat dissipating side of the evaporator, so as to form a refrigerant gas, which is brought back to the second compressor, and wherein the condenser is comprised of the heat dissipating side of the second heat exchanger.

13. The composite heat cycle system according to claim 12, wherein the heat dissipating side of the evaporator comprises a low heat source of a gas liquefier.

14. A power generating heat output facility comprising:
a heat cycle system including a compressor, a turbine, a power generator driven by the turbine, first and second heat exchangers, a pump, and an expander; and
an electric boiler, wherein
working gas compressed in the compressor is chilled and liquefied as it passes a heat dissipating side of the first heat exchanger, after driving the turbine, and is thereafter increased in pressure by the pump to form high-pressure working liquid, which is expanded and evaporated in the expander to form working gas, which is heated as it passes a heat receiving side of the second heat exchanger, and is thereafter brought back to the compressor, and
wherein water for heat output is heated on a heat receiving side of the first heat exchanger and is thereafter further heated by the electric boiler to a predetermined temperature, and electric power generated by the power generator driven by the turbine is supplied to the electric boiler.

15. The power generating heat output facility according to claim 14, wherein the working gas is heated as it passes the heat receiving side of the first heat exchanger before passing the heat receiving side of the second heat exchanger, and a heat dissipating side of the second heat exchanger is comprised of a low-temperature chamber or a waste-heat dissipating portion.

16. The composite heat cycle electric power generation system according to claim 9, further comprising:
   an output terminal for supplying electric power to the outside; and
   a conducting wire for electrically connecting the first and second power generators and the output terminal.

17. A power supply system according to claim 9, wherein electric power generated by the composite heat cycle electric power generation system is delivered through power lines to a power consumption area 500 km or more away.

* * * * *